US009684220B2

(12) United States Patent
Beatty

(10) Patent No.: US 9,684,220 B2
(45) Date of Patent: Jun. 20, 2017

(54) ELECTRO-OPTICAL MODULATOR WITH BIAS CONTROL

(71) Applicant: Intel Corporation, Santa Clara, CA (US)

(72) Inventor: Robert M. Beatty, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 139 days.

(21) Appl. No.: 14/567,571

(22) Filed: Dec. 11, 2014

(65) Prior Publication Data

US 2016/0170284 A1 Jun. 16, 2016

(51) Int. Cl.
*G02F 1/225* (2006.01)
*G02F 1/01* (2006.01)
*H04B 10/50* (2013.01)

(52) U.S. Cl.
CPC ............ *G02F 1/225* (2013.01); *G02F 1/0123* (2013.01); *G02F 1/2257* (2013.01); *H04B 10/50575* (2013.01)

(58) Field of Classification Search
None
See application file for complete search history.

(56) References Cited

U.S. PATENT DOCUMENTS

| 5,627,929 A * | 5/1997 | Vawter ................... G02B 6/125 385/131 |
| 6,614,213 B1 * | 9/2003 | Whitbread ................ G01J 1/42 324/72 |
| 6,904,186 B2 * | 6/2005 | Kondo ................... G02F 1/0123 385/2 |
| 2002/0191266 A1 * | 12/2002 | Melloni ................. G02F 1/225 359/246 |

(Continued)

FOREIGN PATENT DOCUMENTS

| JP | 2007067876 A | 3/2007 |
| JP | 2014010189 A | 1/2014 |

OTHER PUBLICATIONS

Alduino, et al., "Demonstration of a High Speed 4-Channel Integrated Silicon Photonics WDM Link with Hybrid Silicon Lasers," Optical Society of America, 2010, 3 pages.

(Continued)

*Primary Examiner* — Mike Stahl
(74) *Attorney, Agent, or Firm* — Schwabe, Williamson & Wyatt, P.C.

(57) ABSTRACT

Embodiments of the present disclosure are directed toward techniques and configurations for phase offset adjustment in an electro-optical modulator. In one embodiment, the apparatus may include an electro-optical modulator having first and second arms, to modulate light passing through the arms according to an electrical data signal provided to the electro-optical modulator, to output an optical data signal that (Continued)

combines first and second light portions outputted by the first and second arms respectively; and a control module to convert the first and second light portions into first and second power signals indicative of respective phases of the first and second light portions, determine a balance between the first and second power signals, and adjust a phase of one of the first or second light portions, to achieve a bias point to provide the balanced optical data signal. Other embodiments may be described and/or claimed.

14 Claims, 7 Drawing Sheets

(56) References Cited

U.S. PATENT DOCUMENTS

| | | | | |
|---|---|---|---|---|
| 2008/0002926 | A1* | 1/2008 | Kondou | G02F 1/035 385/2 |
| 2009/0129719 | A1* | 5/2009 | Rowinski | G02F 1/035 385/2 |
| 2010/0303469 | A1* | 12/2010 | Barton | H04B 10/505 398/184 |
| 2011/0135319 | A1 | 6/2011 | Youn et al. | |
| 2011/0249936 | A1 | 10/2011 | Welch et al. | |
| 2012/0062900 | A1* | 3/2012 | Langley | G02F 1/225 356/477 |
| 2012/0082467 | A1 | 4/2012 | Nakamoto | |
| 2013/0306848 | A1* | 11/2013 | Dell'Orto | G02F 1/2255 250/227.11 |
| 2014/0241657 | A1* | 8/2014 | Manouvrier | H04B 10/50575 385/3 |
| 2015/0277207 | A1* | 10/2015 | Fujikata | G02F 1/225 385/3 |

OTHER PUBLICATIONS

Koch, et a., "A 4x12.5 Gb/s CWDM Si photonics link using integrated hybrid silicon lasers," Optical Society of America, 2011, 2 pages.
Rattner, et a., "The 50Gbps Si Photonics Link, A research milestone from Intel Labs," 2010, 22 pages.
White Paper., "The 50G Silicon Photonics Link," Intel Labs, Jul. 2010, 5 pages.
International Search Report and Written Opinion mailed Jan. 26, 2016 for International Application No. PCT/US2015/049769, 11 pages.

* cited by examiner

ELECTRO-OPTICAL MODULATOR WITH BIAS CONTROL

FIELD

Embodiments of the present disclosure generally relate to the field of optical data communication, and more particularly, to techniques and configurations for controlling bias in electro-optical modulation devices, such as Mach-Zehnder interferometers.

BACKGROUND

Electro-optical modulation devices, such as Mach-Zehnder interferometers (MZI) may often be used to modulate optical signals at high-speed data transmission. Fabrication of the electro-optical modulation devices may introduce variations in the optical components, including dimensions of optical structures, laser characteristics, physical lengths of the arms of the electro-optical modulation devices, and the like. Furthermore, during operation, e.g., data transmission, additional variations may be introduced, which may negatively affect quality of data transmission.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
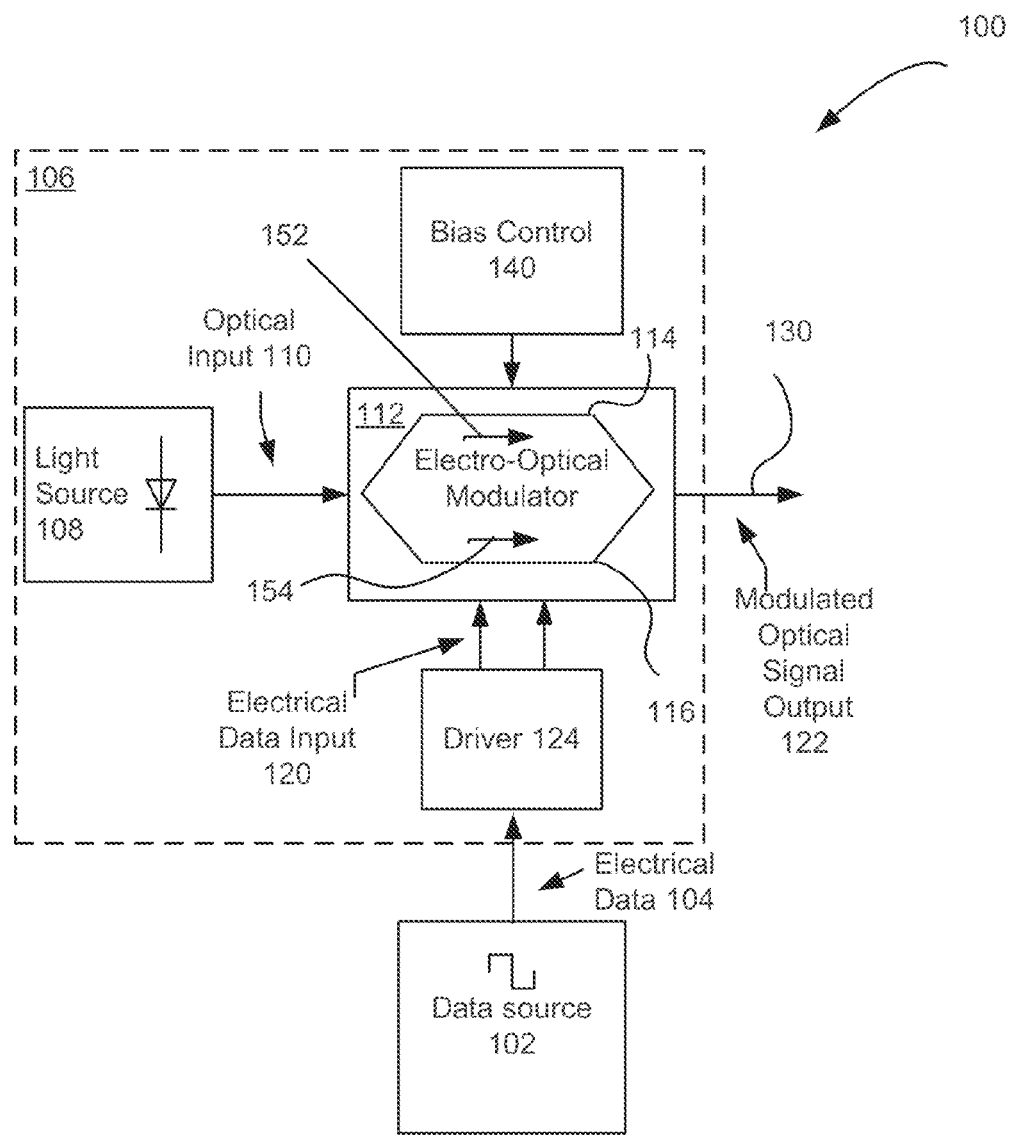
FIG. 1 is a block diagram of an example apparatus that may include an electro-optical modulator with a bias control, in accordance with some embodiments.

Embodiments of the present disclosure describe techniques and configurations for an apparatus comprising an electro-optical modulation device with a bias control and adjustment. In some embodiments, the apparatus may comprise an electro-optical modulator having first and second arms, to modulate light passing through the arms according to an electrical data signal provided to the electro-optical modulator, to output an optical data signal that combines first and second light portions outputted by the first and second arms respectively. The apparatus may further include a control module coupled with the electro-optical modulator to convert the first and second light portions into first and second power signals indicative of respective phases of the first and second light portions, determine a balance between the first and second power signals, and adjust a phase of one of the first or second light portions, to achieve a bias point for the optical data output signal.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of an example apparatus 100 that may include an electro-optical modulator with a bias control and adjustment, in accordance with some embodiments. In some embodiments, the apparatus 100 may comprise a computing device configured with an electro-optical modulation device described herein. The apparatus 100 may include a data source 102, such as a central processing unit (CPU), a router (e.g., with Internet traffic), a graphics chip, and the like. The data source 102 may be configured to generate and/or process data 104 to be provided to another apparatus via a communication interface, such as communicated by a transmitter 106, whose components will be described herein in greater detail. More generally, the apparatus 100 may include an input from any data source that may provide data 104, to be transmitted by the apparatus 100.

As shown, the transmitter 106 may include a light source (e.g., laser) 108 configured to provide optical input (light) 110 into an electro-optical modulator 112 that may be coupled with the light source 108. As will be described below in greater detail, the electro-optical modulator 112 may be a Mach-Zehnder interferometer (MZI), for example.

The electro-optical modulator 112 may include a first arm 114 (e.g., upper arm) and a second arm 116 (e.g., lower arm) configured to pass respective light portions 152, 154 of light 110 input from the light source 108. The electro-optical modulator 112 may be configured to modulate light portions 152, 154 passing through the first and second arms 114, 116 according to an electrical data input 120 provided to the electro-optical modulator 112, to output a modulated optical data signal 122 that may combine first and second light portions 152, 154 outputted by the first and second arms 114, 116 respectively.

The data source 102 may be coupled with a driver 124. The driver 124 may be configured to receive data 104 from the data source 102 and provide electrical data input 120 to first and second arms 114, 116, in order to drive modulation of light portions 152, 154 in the first and second arms 114, 116 according to the data 104. The resulting modulated optical signal output 122 may be provided to a recipient device, e.g., via an optical fiber cable 130, or other optical solution such as waveguide or non-optical solution (e.g., chip-to-chip communication solution).

In some instances, the phases of the light portions 152, 154 passing through the first and second arms 114 and 116 of the opto-electrical modulator 112 may be offset from each other. There may be several reasons for phase offsets between the light portions 152, 154 passing through the first and second arms 114, 116. For example, imperfections of dimensions of optical components of the transmitter 106 may define a fixed or initial phase offset. The initial phase offset may affect a bias point that defines a desired power output of an electro-optical modulator, such as apparatus 106. A bias point may be further affected by external conditions, such as ambient factors. For example, the optical components of the transmitter 106 may be temperature sensitive. Accordingly, the apparatus 100 may be configured to determine a half-intensity transmission point (e.g., n/2 bias point or quadrature point, hereinafter "bias point") that defines a desired power output of the data signal 130 resulting from a combination of light portions 152, 154 in the first and second arms 114, 116, and maintain the bias point to compensate for offset from the bias point due to sensitivity to temperature and instability of optical components (described above) that may cause the bias point to drift over time.

Accordingly, the apparatus 100 may include a bias control module 140 coupled with the electro-optical modulator 112. The bias control module 140 may be configured to determine, at power-on, an initial phase offset between the first and second light portions 152, 154, to achieve a bias point, by adjusting a phase difference between the first or second light portions 152, 154 which accounts for any initial phase offset, and to dynamically compensate drift of the bias point caused by ambient factures (e.g. temperature) during operation using additional phase, in order to maintain the achieved bias point. To that end, the bias control module 140 of the apparatus 100 may include, for example, a device (e.g., a converter, not shown) that may have two inputs corresponding to arms 114 and 116 and have two outputs each having first and second power signals corresponding to first and second light portions 152, 154. The input signals may undergo interference such that the two output power signals may be inversely related. In other words, a minimum power on one converter output may correspond to the maximum power on the other converter output, and vice versa. The operation of the converter associated with the bias control module 140 will be described in greater detail in reference to FIG. 2.

Accordingly, the bias control module 140 may be configured to convert the first and second light portions 152, 154 into first and second power signals (not shown) that may be indicative of respective phases of the first and second light portions 152, 154 in first and second arms 114, 116, determine a bias point for the first and second light portions 152, 154 based on the first and second power signals, and adjust a phase of at least one of the first or second light portions 152, 154 to maintain the bias point. The structure and operation of the apparatus 100 with the bias control module 140 is described in reference to FIGS. 2-5.

Figure 2:
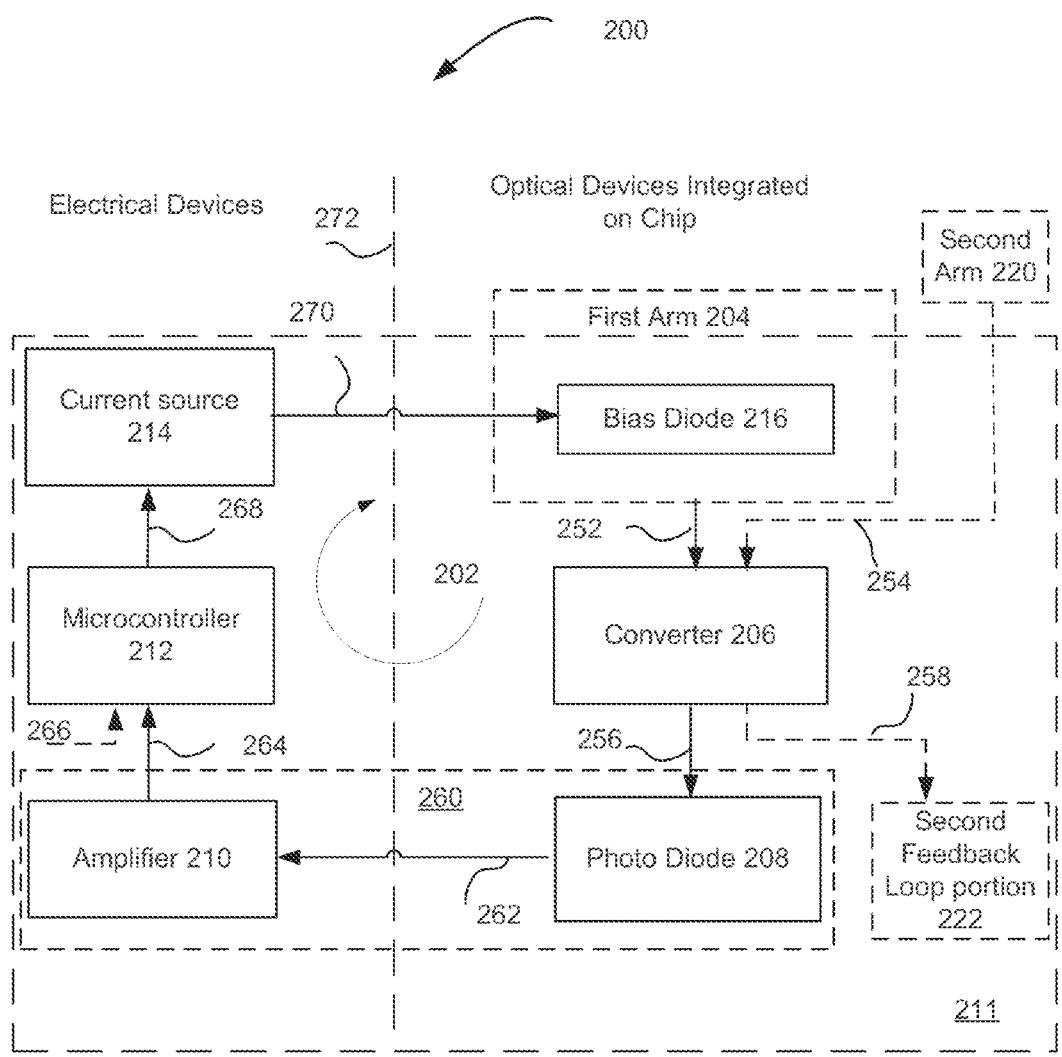
FIG. 2 is a block diagram of an example apparatus having an electro-optical modulator with a bias control module illustrated and described in detail, in accordance with some embodiments.

FIG. 2 is a block diagram of an example apparatus 200 having an electro-optical modulator with a bias control module illustrated and described in detail, in accordance with some embodiments. Some of the components of the apparatus 200 may correspond to the components of the apparatus 100 described above.

The bias control module 211 of the apparatus 200 may comprise a feedback loop having a first feedback loop portion 202 and a second feedback loop portion 222 (shown in dashed lines), configured to control a phase offset between the portions of light in first arm 204 (shown in dashed lines) and second arm 220 (also shown in dashed lines) of an electro-optical modulator in order to maintain the bias point. For simplicity purposes, the feedback loop portion 202 associated with the first arm 204 is described herein. It will be appreciated that the feedback loop portion 222 associated with the second arm 220 may include the components similar to those discussed in reference to the first feedback loop portion 202.

As described in reference to FIG. 1, light 110 may be split at the input of the electro-optical modulator 112 into two light portions 114 and 116 that may travel down the first and second arms 114 and 116. Between the two arms of the electro-optical modulator 112, differences in length or the index of refraction may introduce differences in phase. The optical signal comprising 152 and 154 may be recombined at the output of the electro-optical modulator 112. Phase may constructively or destructively interfere to give a combined modulated optical signal output 122.

Referring now to FIG. 2, the light portions 252, 254 (corresponding to light portions 152 and 154) may be outputted by the first arm 204 (corresponding to arm 114) and second arm 220 (corresponding to arm 116) of the electro-optical modulator to a converter 206 coupled with the electro-optical modulator. As shown, the converter 206 may be coupled with the first arm 204 and second arm 220 via two corresponding inputs. The converter 206 may be configured to convert the first and second light portions 252 and 254 into first and second power signals 256, 258 indicative of respective phases of the first and second light portions 252, 254. Accordingly, the converter 206 may be a 2×2 converter, e.g., the converter 206 may have two inputs and two outputs providing first and second power signals 256, 258. The two outputs may be positioned to be substantially out of phase with each other so that when light is minimized on one output, it may be maximized on the other output. The power signals 256 and 258 may be provided for further processing to the components of the first and second feedback loop portions 202, 222. For example, a portion (e.g., percentage) of light may be redirected from the outputs providing signals 256 and 258, e.g., via an optical tap, for processing. For illustration purposes, processing of the power signal 256 will be described herein in detail. The converter 206 may be coupled with a photo detector 260. The photo detector 260 may comprise a photodiode 208 configured to receive the power signal 256 from the converter 206 and to generate a current signal 262 corresponding to the power signal 256. The photo detector 260 may further comprise an amplifier 210 coupled with the photodiode 208 and configured to convert (and amplify) the current signal 262 into a voltage signal 264. The photo detector 260 and amplifier 210 may be included in the second loop portion 222, which is not shown in FIG. 2 for simplicity purposes.

The amplifier 210 may be coupled to a processing unit, such as a microcontroller 212. The microcontroller 212 may be configured to receive the voltage signal 264 (and corresponding voltage signal 266 from the second feedback loop 222), identify the phase offset based at least in part on the voltage signals 264 and 266 that may determine the bias point, and generate a bias current 268 having a value that may provide for maintaining the determined bias point, when the bias current is injected into one of the first or second arms 204 or 220. Bias current 268 (e.g., in analog form) may be provided to a current source circuit 214 coupled with the microcontroller 212.

The current source circuit 214 may be coupled with the electro-optical modulator (e.g., first arm 204 as shown) and configured to generate a bias current 270 corresponding to a value of the bias current 268 to maintain the bias point. As illustrated in FIG. 2, the current source circuit 214 may provide the bias current 270 to the first arm 204, to adjust the phase of one of the first or second light portions, to achieve the bias point. More specifically, the current source 214 may provide the bias current 270 to a bias diode 216 that may be built into the first arm 204. The bias diode 216 may be configured to inject the bias current 270 into the first arm 204, in order to induce a corrective phase adjustment of the light portion passing through the first arm 204. More generally, injecting bias current of a determined value into one arm 204 (or both arms 204, 220) may change the index of refraction of one arm (or both arms), which may result in the phase adjustment of the respective arm, to achieve the bias point.

As shown by an imaginary dividing line 272, the components of the apparatus 200, in particular bias control module 211 may be categorized into optical devices and electrical devices. The optical devices, such as the electro-optical modulator having arms 204 and 220, the converter 206, the photodiode 208, optical paths between these components (not shown), and corresponding components of the feedback loop 222 may be integrated on a semiconductor die, e.g., in a silicon microchip.

More generally, silicon photonics and/or other advanced material technologies may enable the fabrication of at least optical components of the apparatus 200 onto the same device. Integration of optical components may ensure that optical devices such as, for example, photodiode 208 and corresponding photodiode of second feedback loop 222 (not shown) may perform similarly because they may comprise the same semiconductor material and, therefore, may be characteristically similar. Accordingly, inherent errors that may be introduced during fabrication of the apparatus 100 (200) due to connections (e.g., optical loss due to coupling of different optical devices) or differences in semiconductor properties may be minimized.

Further, due to optical component integration described above, fewer circuit components may be required to implement the control module 200, compared to existing solutions. Also, using a converter with two power signal outputs coupled with respective photodiodes may enable a more direct measurement in order to determine the needed phase difference between two arms of the electro-optical modulator (as described in reference to FIG. 2) and improve data modulation, compared to existing solutions. Improvement may be qualified in terms of power consumption as well as using fewer overall electrical components compared to existing solutions.

Figure 3:
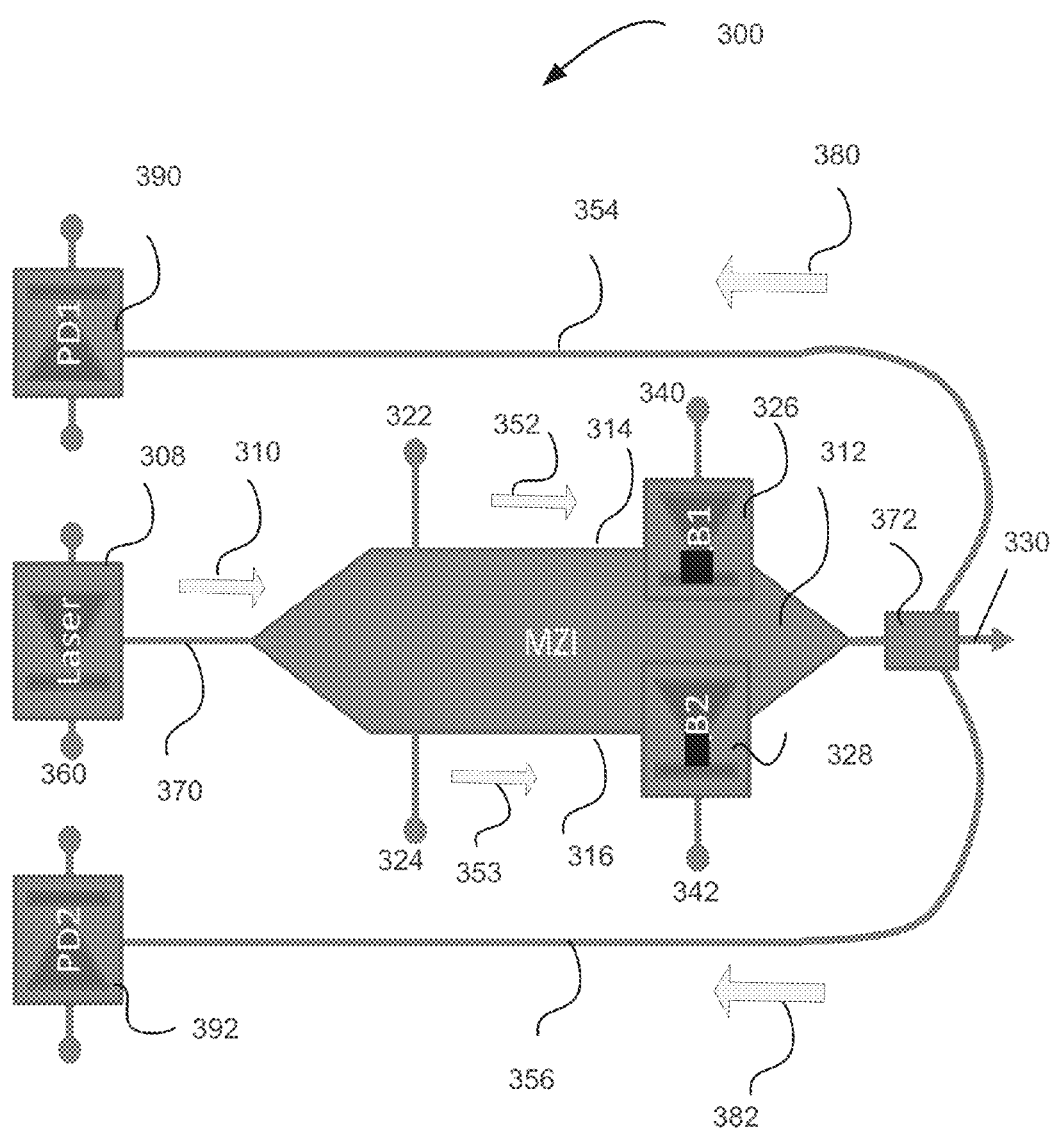
FIG. 3 is a schematic diagram of an apparatus configured with an electro-optical modulator having a feedback loop, in accordance with some embodiments.

FIG. 3 is a schematic diagram of an apparatus 300 configured with an electro-optical modulator having a feedback loop, in accordance with some embodiments. The components of the apparatus 300 may correspond to the components of apparatuses 100 and 200 described in reference to FIGS. 1 and 2. For example, the paths of feedback loops described herein correspond to the feedback loop (having portions 202 and 222) described in reference to FIG. 2. As described above, in some embodiments the electro-optical modulator of the apparatus 300 may comprise an MZI.

The apparatus 300 may include a light source (e.g., laser) 308 having a laser current drive input 360 may be optically coupled via a waveguide 370 to an MZI 312. The MZI 312 may include a first (upper) arm 314 and second (lower) arm 316 configured to pass respective light portions 352 and 354 of light 310 split between two arms. The converter 372 may recombine the light portions 352 and 353 into the modulated optical data signal 330. The signal modulation may be enabled by electrical modulation connections 322, 324 (corresponding to electrical data input 120 of FIG. 1) to respective arms 314 and 316. The bias control may be provided by the bias diodes B1 326 and B2 328 (corresponding to 216 of FIG. 2) built into the arms 314 and 316 respectively.

As described in reference to FIG. 2, the bias point maintenance may be implemented by a provision of a bias current to at least one of the bias diodes 326, 328 via one of respective connections 340, 342. The bias current may be determined based on voltage signals provided to a processor such as microcontroller (not shown) by photodiodes PD1 390 and PD2 392 (via respective amplifiers, not shown) coupled via optical paths 354 and 356 with the controller 372. The optical paths 354 and 356 may be configured to provide to photodiodes 390, 392 power outputs 380 and 382 (similar to 256, 258 of FIG. 2) that are indicative of phases of respective light portions 352, 353.

The converter 372, optical path 354, photodiode 390, and bias diode 326 may comprise optical components of a first part of a feedback loop similar to first feedback loop portion 202 described in reference to FIG. 2. The controller 372, optical path 356, photodiode 392, and bias diode 328 may comprise optical components of a second part of a feedback loop, similar to first feedback loop portion 202 described in reference to FIG. 2. As described in reference to FIG. 2, these optical components may be integrated with the MZI 312 on a semiconductor (e.g., silicon) chip.

The phase of the optical modulated signal may defined by a natural (initial) offset of the phase of the electro-optical modulator and any additional phase on each arm of the MZI $$\phi = \phi_{offset} + \phi_1 - \phi_2$$

where $\phi_{offset}$ is the natural (initial) offset of the output signal,
$\phi_1$ is induced phase on a first (e.g., upper) arm of MZI, and
$\phi_2$ is induced phase on a second (e.g. lower) arm of MZI.

As described above, phases in each arm may be induced by injecting electrical current (bias current) in a respective arm:

$$\phi_1 = \pi \cdot \left(\frac{I_1}{I_\pi}\right)^m$$

$$\phi_2 = \pi \cdot \left(\frac{I_2}{I_\pi}\right)^m$$

where $I_1$, $I_2$ are electrical current values of bias current that may be injected in each MZI, $I\pi$ is efficiency to convert current to on it phase change, and m is a fitting parameter. While most conventional solutions may use voltage controlled bias, the described embodiments provide for application of bias current to an electro-optical modulator to achieve the bias point. In some embodiments, the reference voltage or other means may be used to control the bias point of the MZI.

Figure 4:
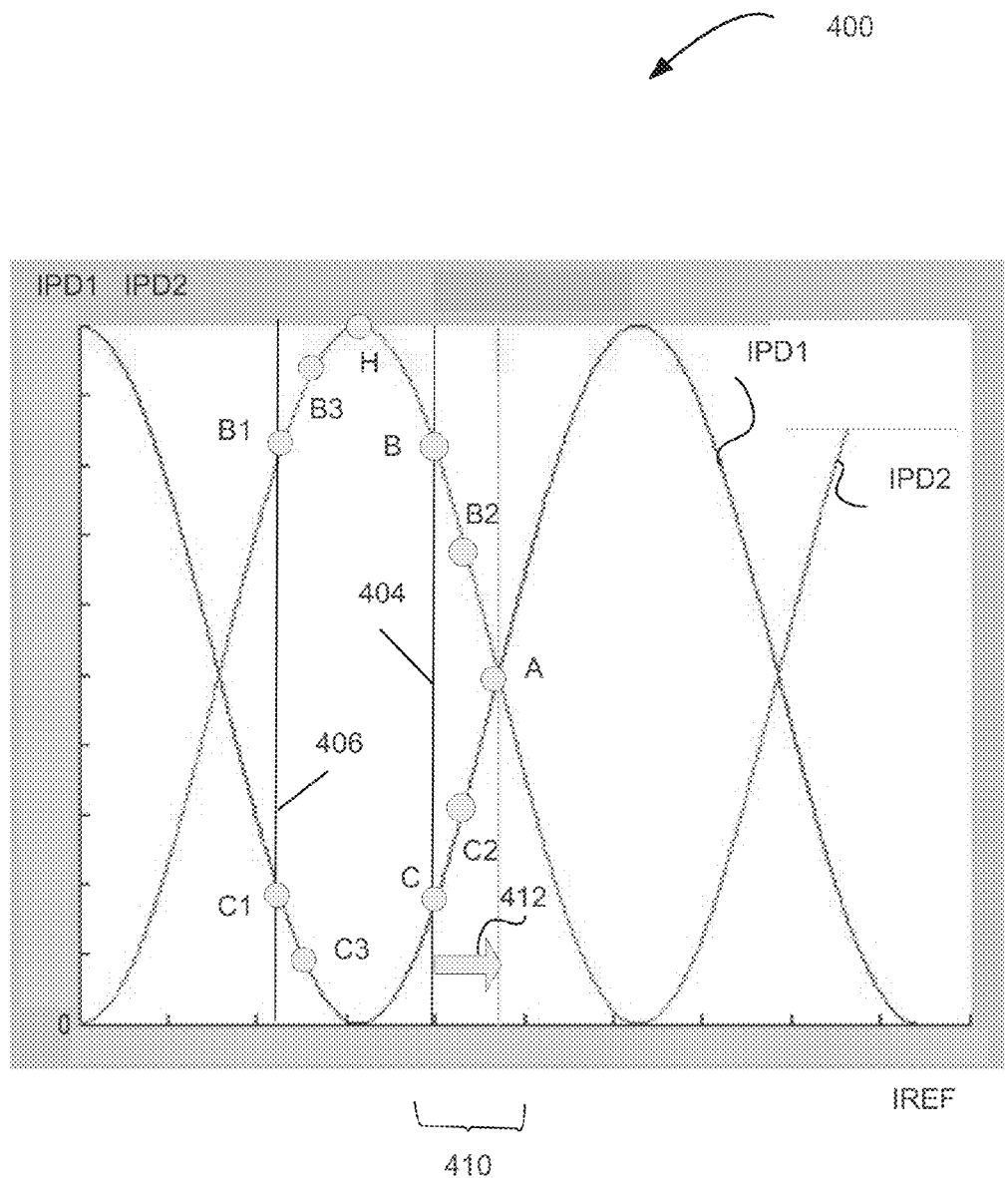
FIG. 4 is a graph illustrating currents outputted by photodiodes of FIG. 3, as a function of bias current or corresponding phase of light signal, in accordance with some embodiments.

FIG. 4 is a graph 400 illustrating current curves IPD1 and IPD2 (Y-axis) outputted by photodiodes PD1 390 and PD2 392 of FIG. 3 (hereinafter PD1 and PD2), as a function of bias current IREF on the MZI (X-axis). Bias current IREF may represent current of a value that may be injected in one of the arms of the MZI 312 to adjust a phase of a light signal portion passing through the MZI arm, in accordance with some embodiments. As described above, photodiodes PD1 and PD2 may measure the optical power of signals provided by the two outputs of the converter 372. Accordingly, current values IPD1 and IPD2 may correspond to optical power of light 380 and 382 on the two return paths 354 and 356 from the outputs of the converter 372. Bias current IREF may be used to adjust phase on the arms of MZI to achieve balance in optical power of the two outputs of the converter 372. The units in which the X-axis and Y-axis may be calibrated may be different depending on implementation and are not shown in FIG. 4. It will be understood that X-axis may be rescaled to a particular value of IREF or plotted as a phase corresponding to current, and Y-axis may be scaled to a particular value, e.g., normalized to 1, for example. Balance of photocurrents outputted by photodiodes may be illustrated as the points in the graph 400 where IPD1=IPD2, for example, indicated by point A. Due to reasons described above, there may be an initial phase offset, indicated for example, by point B on IPD2 curve and corresponding point C on IPD1 curve.

The bias control module (e.g., 140) coupled with the MZI (e.g., 112) may be configured to determine a bias point (e.g., point A in graph 400) in which the optical power of the light portions of the output of the converter may be balanced. The bias control module may be configured to determine a bias current value 410 that, if applied to one of the arms of the MZI, may balance the power output of light portions of the output of the converter, thus compensating for the initial phase offset and arriving to the bias point. The bias control module may be further configured to maintain this optical power balance (e.g., bias point) during the operation of the MZI, using the feedback loop discussed in reference to FIGS. 2-3.

Figure 5:
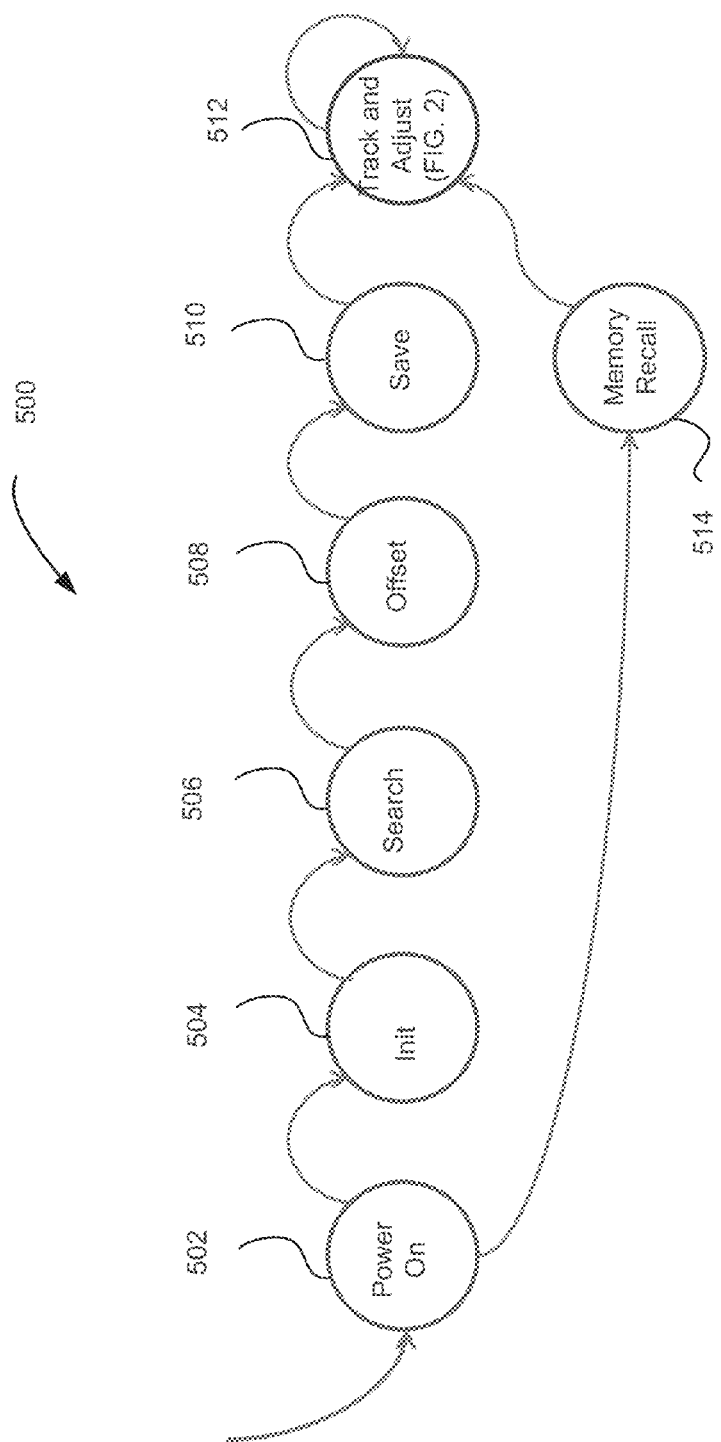
FIG. 5 is a schematic diagram illustrating an example state machine for operation of an apparatus having an electro-optical modulator coupled with a control module to determine and maintain a bias point, in accordance with some embodiments.

FIG. 5 is a schematic diagram illustrating an example state machine 500 for operation of an apparatus having an electro-optical modulator coupled with a control module to determine and maintain a bias point, in accordance with some embodiments. The apparatus may comprise the apparatus 100 with the electro-optical modulator 112 coupled with the bias control module 140 (FIG. 1). The apparatus may include components of apparatus 200, such as bias control module 211, which was described in detail in reference to FIG. 2. As discussed, the electro-optical modulator 112 may comprise an MZI, such as MZI 312 described in reference to FIG. 3.

The state machine 500 may start at a power-on state 502, in which the apparatus 100 may be powered on. The power-on state 502 may include an initial power-on, in which the apparatus 100 is powered on for a very first time. In power-on state 502, the bias control module 140 may access associated memory to determine whether a previously determined bias current value (and an arm to apply the bias current) is stored in the memory accessible by the bias control module 140. For example, the memory may comprise the memory of the microcontroller 212, a component of the bias control module described in reference to FIG. 2, or any memory that may be accessible by the microcontroller 212.

If a previously found solution (e.g., bias current value) is determined to be stored in the memory, the state machine 500 may move to memory recall state 514, in order to retrieve and utilize the stored information in a track and adjust state 512 described below. Otherwise, the state machine 500 may move to initialization state 504.

At the initialization state 504, bias current may not be applied to at least one the arms of the electro-optical modulator, e.g., no bias control may be applied to the arms. Accordingly, the region of phase with respect to the bias point may be determined. Referring to FIG. 4, in the absence of application of bias current, the output current of photodiodes PD1 and PD2 (and corresponding phases) may be determined. For example, it may be determined that IPD1=C and IPD2=B. A relationship between IPD1 and IPD2 may also be determined. In the illustrated example in FIG. 4, as evident from IPD1 and IPD2 curves of FIG. 4, B>C, e.g., IPD2>IPD1. The determined relationship between IPD1 and IPD2 (e.g., IPD2>IPD1) may be saved in memory for reference at next state of the state machine 500.

However, it may not be known to what side of the curves IPD1 and IPD2 (e.g., relative to point H in graph 400) the values equal B and C may belong. In other words, the values equal B and C may belong to the right from point H (indicated by points B and C on line 404) or to the left from point H (indicated by points B1 and C1 on line 406). In order to determine the bias current value need for phase offset compensation, the positions of the values B and C in the curves IPD1 and IPD2 of graph 400 (and corresponding initial state of the apparatus when powered-on) may need be established.

In order to establish the positions of values B and C in graph 400, the electro-optical modulator may be tested e.g., by injecting different levels of bias current (e.g., gradually increasing bias current) into the first and second arms, one arm at a time, to induce a phase difference between the first and second light portions prior to the modulation.

Accordingly, the state machine 500 may move to search state 506, in which the testing of the arms of the electro-optical modulator may be conducted. More specifically, bias current may be applied to the arms of the electro-optical modulator in order to find the point at which relationship between IPD1 and IPD2 inverts. For example, if it has been determined at state 504 that IPD2>IPD1, applying the bias current to one of the arms may gradually change this relationship. For example, if the bias current IREF is applied to one arm, the power of light portion and phase of the light portion in this arm may decrease or increase, which may be indicated by the direction of change of corresponding value IPD2 and IPD1 in graph 400.

In other words, as a result of application of bias current IREF, IPD2 may gradually decrease, e.g., from B to B2, while IPD1 may gradually increase, e.g., from C to C2. Put simply, it may be determined that the values IPD1 and IPD2 are changing relative to each other in the direction indicated by arrow 412. Continuing with bias current application, a point may be reached at which the relationship between IPD2 and IPD1 may invert, e.g., IPD1 may become greater than IPD2. The inversion of relationship between IPD2 and IPD1 may indicate that the bias point A has been reached. The value of bias current IREF at which the relationship between IPD2 and IPD1 inverses may be saved in memory for future application.

Conversely, it may be determined during the application of IREF to an arm of the electro-optical modulator that the difference between values IPD2 and IPD1 becomes greater, e.g., B1 increases to B3, while C1 decreases to C3. This determination may result in conclusion that the initial position of values B and C in curves IPD1 and IPD2 may correspond to a region to the left of point H. Accordingly, IREF may be applied at a greater range than the application of IREF in the above example, to drive the relationship between IPD1 and IPD2 to the bias point A (e.g., where IPD1=IPD2). Accordingly, knowing initial relationship between IPD1 and IPD2, e.g., IPD1>IPD2 or IPD1<IPD2, a selection may be made as to which of the first (upper) or second (lower) arm of the electro-optical modulator may be more convenient to use, in order to drive the bias current to compensate for the same bias point. There may be a range of solutions in the area around bias point A, e.g., proximate to IPD1=IPD2. This range may be determined (e.g., a priori) by the bit error rate (BER), which may be measured over time.

The state machine 500 may move to offset state 508, in which bias current value determined at step 506 may be adjusted. For example, it may be determined that the bias current applied to one of the arms (e.g., upper arm) of the MZI determined at step 506 is below a determined threshold. More specifically, it may be determined that the bias current required to bring IPD1 and IPD2 to the bias point A may be about zero units (e.g., mA). In this case, a fixed amount of bias current may be applied to the opposite (e.g., lower) arm of the MZI. Effectually this may increase the range of the bias current applied to the upper arm by moving phase in the opposite direction and therefore increasing the amount of bias current needed to apply to the upper arm to reach the bias point A in FIG. 4.

The state machine 500 may move to save state 510, in which at least the determined bias current value may be saved to a non-volatile memory, which may be accessible by the apparatus 100 (e.g., bias control module 140) at memory recall step 514. An arm selection may also be saved. In some instances, the bias current value to be applied to an opposite arm, if determined at step 508, may also be saved, to be utilized at track and adjust state 512.

The state machine 500 may move to track and adjust state 512, in which the photodiodes PD1 and PD2 (e.g., 390 and 392 in FIG. 3) may be continuously monitored, the bias current may be adjusted according to results of the monitoring and applied to an arm of the electro-optical modulator, to maintain balance between IPD1 and IPD2 and corresponding phases of light portions in respective arms of the electro-optical modulator. The track and adjust state 512 has been described in detail in reference to FIGS. 2 and 3.

If the apparatus is powered off and then returned back to subsequent power-on state 502, the state machine 500 may move to memory recall state 514 and continue tracking and adjusting phase offset using the initial parameters saved in the memory, as described in reference to state 502. The described technique may reduce the time of provisioning the apparatus to an operational state, compared to a cold-start provisioning, in which states 502, 504, 506, 508, and 510 have to be repeated each time before the state machine may move to track and adjust state 512.

To complement already described phase offset adjustment techniques, additional control and adjustment techniques to counter different sources of errors may be implemented. For example, it may be possible to determine if there is a fabrication mismatch between the photodiodes 390 and 392 and corresponding optical paths 354 and 356 (with reference to FIG. 3). For example, both arms 314 and 316 may be driven with a bias current one at a time, maximum current values pertaining to each photodiodes (e.g., MAX IPD1 and MAX IPD2) may be determined, and a correction factor MAX IPD2/MAX IPD1 may be derived. This correction factor may be applied to subsequent photodiode measurements to correct for the error pertaining to the fabrication mismatch.

Figure 6:
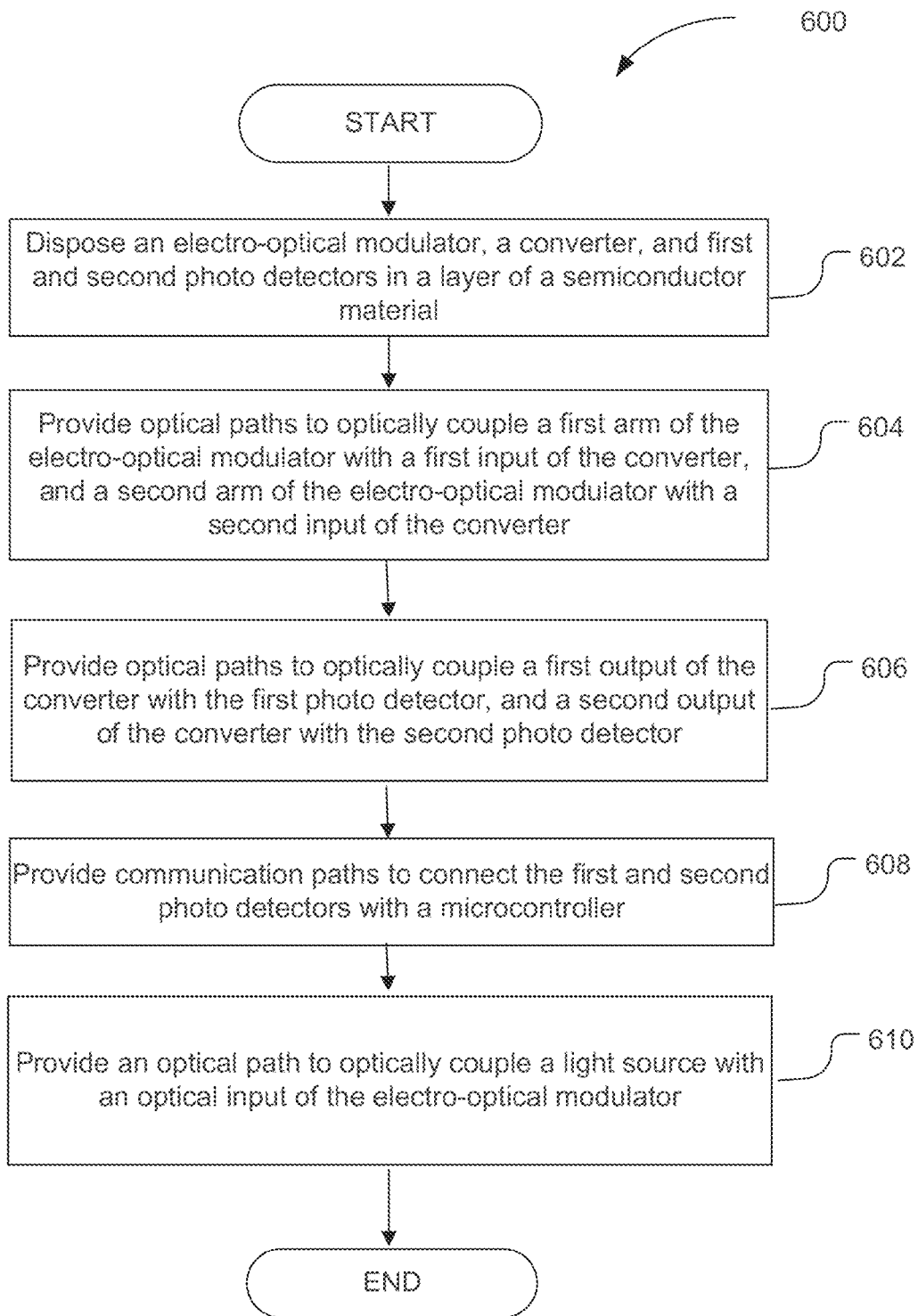
FIG. 6 is a process flow diagram for assembling an apparatus comprising an electro-optical modulator with bias control and adjustment as described herein, in accordance with some embodiments.

FIG. 6 is a process flow diagram 600 for assembling an apparatus comprising an electro-optical modulator with bias control as described herein, in accordance with some embodiments. The apparatus may include the components of apparatuses 100, 200, and 300 described in reference to FIGS. 1, 2, and 3 respectively, and will be referenced accordingly. The operations described in reference to FIG. 6 may not need to be performed in the order described.

At block 602, the process 600 may include disposing an electro-optical modulator, a converter, and first and second photo detectors in a layer of a semiconductor material, e.g., in a silicon die and/or in III-V compound semiconductors. With reference to FIG. 3, the modulator may comprise the MZI 312, the converter may comprise the converter 372, and photo detectors may comprise photodiodes PD1 390 and PD2 392.

At block 604, the process 600 may include providing optical paths to optically couple a first arm of the electro-optical modulator with a first input of the converter, and a second arm of the electro-optical modulator with a second input of the converter. The optical paths may provide paths for optical signals 252 and 254 described in reference to FIG. 2.

At block 606, the process 600 may include providing optical paths to optically couple a first output of the converter with the first photo detector, and a second output of the converter with the second photo detector. The optical paths may comprise the paths 354 and 356 and provide paths for signals 256 (354) and 258 (382), respectively.

At block 608, the process 600 may include providing communication paths to connect the first and second photo detectors (e.g., photo detector 260 and the photo detector of the second feedback loop 222, not shown in FIG. 2) with a microcontroller (e.g., microcontroller 212). The communication paths may enable delivery of signals 266 and 264 provided by photo detector 260 and the photo detector of second feedback loop 222 to microcontroller 212. As described above, the microcontroller may be configured to enable phase offset compensation between the first and second arms of the electro-optical modulator based on outputs provided by the first and second photo detectors during operation of the electro-optical modulator.

At block 610, the process 600 may include providing an optical path to optically couple a light source (e.g., laser 360) with an optical input (e.g., 370) of the electro-optical modulator (e.g., MZI 312).

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Figure 7:
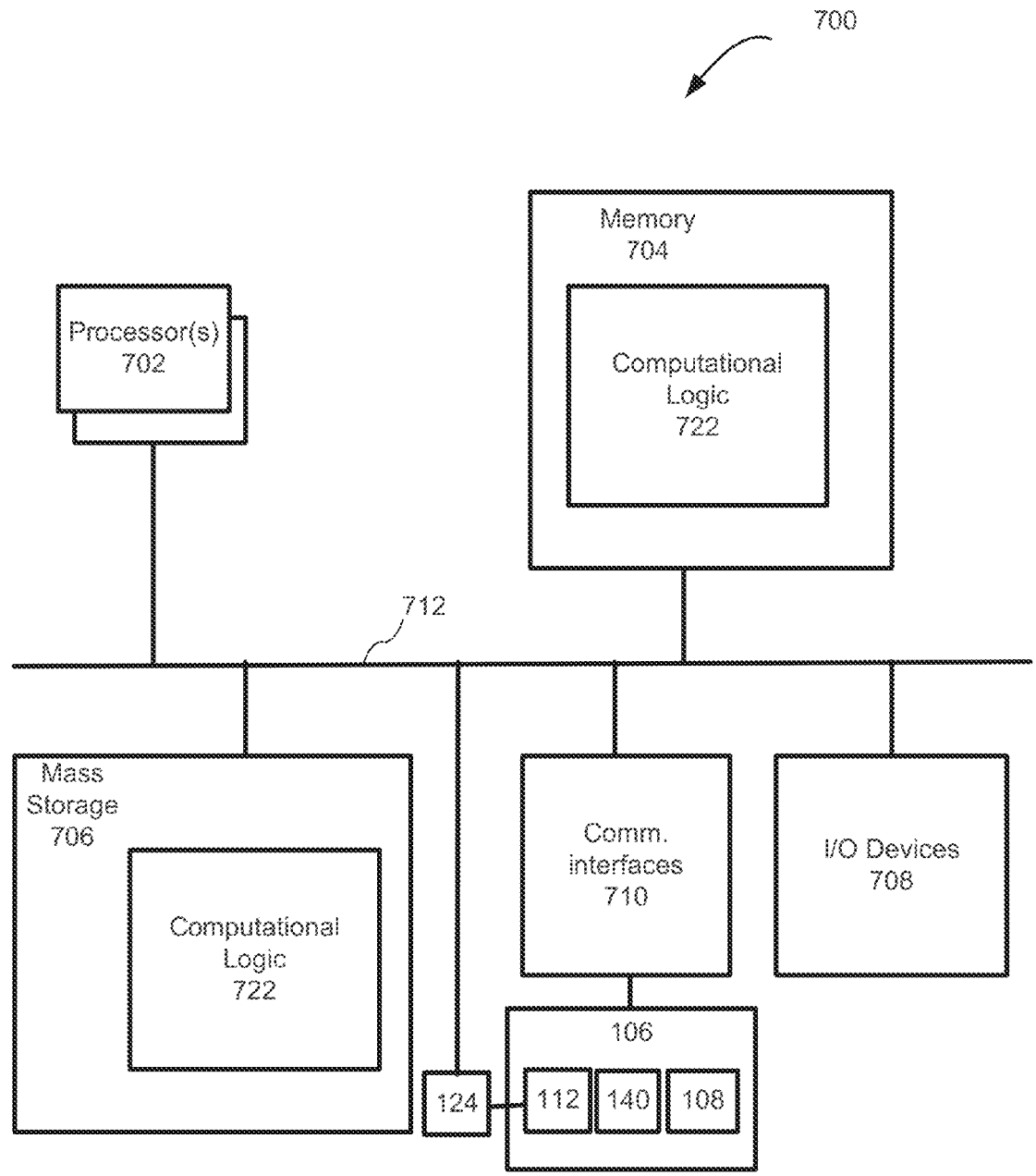
FIG. 7 is an example computing device suitable for use with various components of apparatuses of FIGS. 1-3, in accordance with some embodiments.

FIG. 7 is an example computing device 700 suitable for use with various components of apparatuses of FIGS. 1-3, in accordance with some embodiments. In some embodiments, example computing device 700 may include various components of apparatus 100, e.g., transmitter 106 including the electro-optical modulator 112, bias control module 140, and light source 108, as well as driver 124 described in reference to FIG. 1. The example computing device 700 with the above components of apparatus 100 may be used in the field of optical communications, telecommunications and data communications, e.g., high speed communications such as Internet data transmission, intra-CPU communications, and the like.

As shown, computing device 700 may include one or more processors or processor cores 702 and system memory 704. For the purpose of this application, including the claims, the terms "processor" and "processor cores" may be considered synonymous, unless the context clearly requires otherwise. The processor 702 may include any type of processors, such as a central processing unit (CPU), a microprocessor, and the like. The processor 702 may be implemented as an integrated circuit having multi-cores, e.g., a multi-core microprocessor. The computing device 700 may include mass storage devices 706 (such as diskette, hard drive, volatile memory (e.g., dynamic random-access memory (DRAM), compact disc read-only memory (CD-ROM), digital versatile disk (DVD), and so forth)). In general, system memory 704 and/or mass storage devices 706 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth.

The computing device 700 may further include input/output (I/O) devices 708 (such as a display (e.g., a touchscreen display), keyboard, cursor control, remote control, gaming controller, image capture device, and so forth) and communication interfaces 710 (such as network interface cards, optical apparatuses, modems, infrared receivers, radio receivers (e.g., Bluetooth), and so forth). In some embodiments, the communication interfaces 710 may include at least some components referenced in FIG. 1, such as transmitter 106 including the electro-optical modulator 112, bias control module 140, and light source 108, implementing aspects of the embodiments described above. The computing device 700 having the transmitter 106 may be configured to operate in high-speed or low-speed data communications environment.

The communication interfaces 710 may include communication chips (not shown) that may be configured to operate the computing device 700 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 710 may operate in accordance with other wireless protocols in other embodiments.

The above-described computing device 700 elements may be coupled to each other via system bus 712, which may represent one or more buses. In the case of multiple buses, they may be bridged by one or more bus bridges (not shown). Each of these elements may perform its conventional functions known in the art. In particular, system memory 704 and mass storage devices 706 may be employed to store a working copy and a permanent copy of the programming instructions for the operation of the state machine described in reference to FIG. 5, generally denoted as computational logic 722. The various elements may be implemented by assembler instructions supported by processor(s) 702 or high-level languages that may be compiled into such instructions.

The permanent copy of the programming instructions may be placed into permanent storage devices 706 in the factory, or in the field through, for example, a distribution medium (not shown), such as a compact disc (CD), or through communication interface 710 (from a distribution server (not shown)). That is, one or more distribution media having an implementation of the agent program may be employed to distribute the agent and to program various computing devices.

The number, capability, and/or capacity of the elements 708, 710, 712 may vary, depending on whether computing device 700 is used as a stationary computing device, such as a set-top box or desktop computer (e.g., a server), or a mobile computing device, such as a tablet computing device, laptop computer, game console, or smartphone. Their constitutions are otherwise known, and accordingly will not be further described.

At least one of processors 702 may be packaged together with memory having computational logic 722 configured to practice aspects of embodiments described in reference to FIGS. 1-5, e.g., provide data to the transmitter 106 via driver 124 for transmission, e.g., to another computing device (not shown). For one embodiment, at least one of processors 702 may be packaged together with memory having computational logic 722 to form a System in Package (SiP) or a System on Chip (SoC). For at least one embodiment, the SoC may be utilized in, e.g., but not limited to, a computing device such as a laptop, desktop, computing tablet or smartphone.

In various implementations, the computing device 700 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 700 may be any other electronic device that processes data.

The following paragraphs describe examples of various embodiments. Example 1 is an apparatus for electro-optical modulation, comprising: an electro-optical modulator having first and second arms, to modulate light passing through the first and second arms according to an electrical data signal provided to the electro-optical modulator, to output an optical data signal that combines first and second light portions outputted by the first and second arms respectively; and a control module coupled with the electro-optical modulator, to convert the first and second light portions into first and second power signals indicative of respective phases of the first and second light portions, determine a balance between the first and second power signals, and adjust a phase of one of the first or second light portions, to achieve a bias point to provide the balanced optical data signal.

Example 2 may include the subject matter of Example 1, wherein the control module is to determine, at power-on, a bias current to adjust a phase of one of the first or second light portions to achieve the balance between the first and second power signals.

Example 3 may include the subject matter of Example 2, wherein the control module is to determine the bias current via injection of at least first and second levels of current into the first and second arms, one arm at a time, to determine the bias point between the first and second light portions prior to the modulation, wherein the first level is different than the second level, wherein the bias point is based on the first and second power signals.

Example 4 may include the subject matter of Example 3, wherein the control module comprises a converter having a first output and a second output, to convert the modulated first and second light portions into the first and second power signals and to output the first power signal at the first output and the second power signal at the second output; a first photo detector coupled with the first output, and a second photo detector coupled with the second output, to generate first and second voltage signals that correspond to the first and second power signals respectively; and a microcontroller coupled with the first and second photo detectors to receive the first and second voltage signals, determine the bias point based at least in part on the first and second voltage signals, and generate a bias current to inject into one of the first or second arms, to achieve the bias point.

Example 5 may include the subject matter of Example 4, wherein the first photo detector comprises a first photodiode to generate a first current signal corresponding to the first power signal and a first amplifier coupled with the first photodiode to convert the first current signal into the first voltage signal, and wherein the second photo detector comprises a second photodiode to generate a second current signal corresponding to the second power signal and a second amplifier coupled with the second photodiode to convert the second current signal into the second voltage signal.

Example 6 may include the subject matter of Example 5, further comprising a current source circuit coupled with the electro-optical modulator to provide the bias current to one of the first or second arms, to adjust the phase of one of the first or second light portions, to maintain the bias point.

Example 7 may include the subject matter of Example 6, wherein the current source circuit includes first and second bias diodes coupled with the first and second arms respectively, to inject the bias current into one of the first or second arms.

Example 8 may include the subject matter of Example 7, further comprising a laser coupled with the electro-optical modulator to provide light into the first and second arms of the electro-optical modulator.

Example 9 may include the subject matter of Example 8, wherein the electro-optical modulator is a Mach-Zehnder interferometer.

Example 10 may include the subject matter of Example 9, further comprising first and second optical paths to optically couple the first and second outputs of the converter with the first and second photodiodes; wherein the Mach-Zehnder interferometer, the converter, the first and second photodiodes, and the first and second optical paths are integrated in a chip comprising a semiconductor material.

Example 11 may include the subject matter of Example 10, wherein the semiconductor material comprises a III-V semiconductor compound material.

Example 12 may include the subject matter of Example 1, wherein the apparatus is a computing device, and wherein the optical data signal comprises data to be transmitted by the computing device, based on the electrical data signal provided to the first and second arms of the electro-optical modulator.

Example 13 is an apparatus for electro-optical modulation, comprising: an electro-optical modulator having first and second arms, to modulate first and second portions of light passing through the first and second arms according to an electrical data signal provided to the first and second arms of the electro-optical modulator, to output an optical data signal that combines the first and second light portions; a converter coupled with the electro-optical modulator, to convert the first and second light portions into first and second power signals indicative of respective phases of the first and second light portions; first and second photo detectors coupled with the converter, to generate first and second voltage signals that correspond to the first and second power signals respectively; and a microcontroller coupled with the first and second photo detectors to determine a balance between the first and second voltage signals, and adjust a phase of one of the first or second light portions, to achieve a bias point to provide the balanced optical data signal, wherein at least the electro-optical modulator, the converter, and the first and second photo detectors are integrated on a microchip comprising a semiconductor.

Example 14 may include the subject matter of Example 13, wherein the electro-optical modulator is to output an optical data signal that combines the first and second light portions.

Example 15 may include the subject matter of Example 13, wherein the electro-optical modulator comprises a Mach-Zehnder interferometer.

Example 16 may include the subject matter of Example 13, wherein the microcontroller is to determine, at power-on, a bias current based on the first and second voltage signals, wherein the microcontroller is to adjust a phase of one of the first or second light portions by causing the bias current to be injected in a respective arm of the electro-optical modulator.

Example 17 is a method for fabricating an electro-optical modulation apparatus, comprising: disposing an electro-optical modulator, a converter, and first and second photo detectors in a layer of a semiconductor material; providing optical paths to optically couple a first arm of the electro-optical modulator with a first input of the converter, and a second arm of the electro-optical modulator with a second input of the converter; and providing optical paths to optically couple a first output of the converter with the first photo detector, and a second output of the converter with the second photo detector.

Example 18 may include the subject matter of Example 17, further comprising: providing communication paths to connect the first and second photo detectors with a microcontroller, wherein the microcontroller is to enable a phase offset compensation between the first and second arms of the electro-optical modulator based on outputs provided by the first and second photo detectors during operation of the electro-optical modulator.

Example 19 may include the subject matter of Example 17, further comprising: embedding a first bias diode with the first arm, and embedding a second bias diode with the second arm, to enable current injection into the first or second arm, to provide the phase offset compensation during the operation of the electro-optical modulator.

Example 20 may include the subject matter of Example 17, further comprising: providing an optical path to optically couple a light source with an optical input of the electro-optical modulator.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An apparatus comprising:
    an electro-optical modulator having first and second arms, to modulate light passing through the first and second arms according to an electrical data signal provided to the electro-optical modulator, to output an optical data signal that combines first and second light portions outputted by the first and second arms respectively; and
    a control module coupled with the electro-optical modulator, to convert the first and second light portions into first and second power signals indicative of respective phases of the first and second light portions, determine a balance between the first and second power signals, and adjust a phase of one of the first or second light portions, to achieve a bias point to provide the optical data signal, and is further to determine, at power-on, a bias current to adjust a phase of one of the first or second light portions to achieve the balance between the first and second power signals.

2. The apparatus of claim 1, wherein the control module is to determine the bias current via injection of at least first and second levels of current into the first and second arms, one arm at a time, to determine the bias point between the first and second light portions prior to the modulation, wherein the first level is different than the second level, wherein the bias point is based on the first and second power signals.

3. The apparatus of claim 2, wherein the control module comprises a converter having a first output and a second output, to convert the modulated first and second light portions into the first and second power signals and to output the first power signal at the first output and the second power signal at the second output;
    a first photo detector coupled with the first output, and a second photo detector coupled with the second output, to generate first and second voltage signals that correspond to the first and second power signals respectively; and
    a microcontroller coupled with the first and second photo detectors to receive the first and second voltage signals, determine the bias point based at least in part on the first and second voltage signals, and generate a bias current to inject into one of the first or second arms, to achieve the bias point.

4. The apparatus of claim 3, wherein the first photo detector comprises a first photodiode to generate a first current signal corresponding to the first power signal and a first amplifier coupled with the first photodiode to convert the first current signal into the first voltage signal, and
    wherein the second photo detector comprises a second photodiode to generate a second current signal corresponding to the second power signal and a second amplifier coupled with the second photodiode to convert the second current signal into the second voltage signal.

5. The apparatus of claim 4, further comprising a current source circuit coupled with the electro-optical modulator to provide the bias current to one of the first or second arms, to adjust the phase of one of the first or second light portions, to maintain the bias point.

6. The apparatus of claim 5, wherein the current source circuit includes first and second bias diodes coupled with the first and second arms respectively, to inject the bias current into one of the first or second arms.

7. The apparatus of claim 6, further comprising a laser coupled with the electro-optical modulator to provide light into the first and second arms of the electro-optical modulator.

8. The apparatus of claim 7, wherein the electro-optical modulator is a Mach-Zehnder interferometer.

9. The apparatus of claim 8, further comprising first and second optical paths to optically couple the first and second outputs of the converter with the first and second photodiodes; wherein the Mach-Zehnder interferometer, the converter, the first and second photodiodes, and the first and second optical paths are integrated in a chip comprising a semiconductor material.

10. The apparatus of claim 9, wherein the semiconductor material comprises a III-V semiconductor compound material.

11. The apparatus of claim 1, wherein the apparatus is a computing device, and wherein the optical data signal comprises data to be transmitted by the computing device, based on the electrical data signal provided to the first and second arms of the electro-optical modulator.

12. An apparatus, comprising:
    an electro-optical modulator having first and second arms, to modulate first and second portions of light passing through the first and second arms according to an electrical data signal provided to the first and second arms of the electro-optical modulator, to output an optical data signal that combines the first and second light portions;

a converter coupled with the electro-optical modulator, to convert the first and second light portions into first and second power signals indicative of respective phases of the first and second light portions;

first and second photo detectors coupled with the converter, to generate first and second voltage signals that correspond to the first and second power signals respectively; and a microcontroller coupled with the first and second photo detectors to determine a balance between the first and second voltage signals, and adjust a phase of one of the first or second light portions, to achieve a bias point to provide the optical data signal, wherein at least the electro-optical modulator, the converter, and the first and second photo detectors are integrated on a microchip comprising a semiconductor.

13. The apparatus of claim 12, wherein the electro-optical modulator comprises a Mach-Zehnder interferometer.

14. The apparatus of claim 12, wherein the microcontroller is to determine, at power-on, a bias current based on the first and second voltage signals, wherein the microcontroller is to adjust a phase of one of the first or second light portions by causing the bias current to be injected in a respective arm of the electro-optical modulator.

* * * * *